United States Patent
Garcia et al.

(10) Patent No.: US 11,982,534 B2
(45) Date of Patent: May 14, 2024

(54) PREDICTION OF A CARTOGRAPHIC READJUSTMENT PARAMETER BY DEEP LEARNING

(71) Applicants: Continental Automotive France, Toulouse (FR); Continental Automotive GmbH, Hannover (DE)

(72) Inventors: Lucien Garcia, Toulouse (FR); Willy Vigneau, Toulouse (FR)

(73) Assignees: Continental Automotive France (FR); Continental Automotive GmbH (DE)

( * ) Notice: Subject to any disclaimer, the term of this patent is extended or adjusted under 35 U.S.C. 154(b) by 436 days.

(21) Appl. No.: 17/273,480

(22) PCT Filed: Aug. 20, 2019

(86) PCT No.: PCT/EP2019/072287
§ 371 (c)(1),
(2) Date: Mar. 4, 2021

(87) PCT Pub. No.: WO2020/048770
PCT Pub. Date: Mar. 12, 2020

(65) Prior Publication Data
US 2021/0356294 A1 Nov. 18, 2021

(30) Foreign Application Priority Data
Sep. 7, 2018 (FR) ...................... 1858045

(51) Int. Cl.
*G01C 21/30* (2006.01)
*G01C 21/00* (2006.01)
(Continued)

(52) U.S. Cl.
CPC ......... *G01C 21/30* (2013.01); *G01C 21/3461* (2013.01); *G01C 21/3815* (2020.08);
(Continued)

(58) Field of Classification Search
CPC ................ G01C 21/30; G01C 21/3461; G01C 21/3815; G01C 21/3819; G01C 21/3844;
(Continued)

(56) References Cited

FOREIGN PATENT DOCUMENTS

| JP | 2006078286 A | * | 3/2006 |
| JP | 2006078286 A | | 3/2006 |

OTHER PUBLICATIONS

JP-2006078286-A, (Year: 2006), English Translation.*
(Continued)

*Primary Examiner* — Rodney A Butler
(74) *Attorney, Agent, or Firm* — Buchanan Ingersoll & Rooney PC

(57) ABSTRACT

Subjects of the present disclosure are methods for training deep learning models, methods for predicting a map matching parameter, methods for updating a digital road map, and a computer program making it possible to implement the methods and devices for updating a digital road map. The general principle is based on the use of machine learning. Accordingly, a statistical deep learning model is trained according to a "supervised" machine learning scheme. Thereafter, the pretrained statistical deep learning model is used to predict a map matching parameter on the basis of a measurement of geographic coordinates and of an identifier of the position sensor that has performed the measurement of geographic coordinates. Finally, the map matching parameter can be used to update a digital road map.

17 Claims, 3 Drawing Sheets

(51) Int. Cl.
*G01C 21/34* (2006.01)
*G01S 19/07* (2010.01)
*G01S 19/25* (2010.01)
*G06F 18/21* (2023.01)
*G06F 18/214* (2023.01)
*G06N 3/04* (2023.01)

(52) U.S. Cl.
CPC ..... *G01C 21/3819* (2020.08); *G01C 21/3844* (2020.08); *G01C 21/3859* (2020.08); *G01C 21/3878* (2020.08); *G01S 19/072* (2019.08); *G01S 19/258* (2013.01); *G06F 18/214* (2023.01); *G06N 3/04* (2013.01)

(58) Field of Classification Search
CPC .. G01C 21/3859; G01C 21/3878; G06N 3/04; G06F 18/214; G01S 19/072; G01S 19/258
See application file for complete search history.

(56) References Cited

OTHER PUBLICATIONS

"Apprentissage Profond", Wikipedia, 2018, retrieved from the internet at https//fr.wikipedia.org/w/index.php?title=Apprentissage_profond&oldid=150128306, 13 pages, with English translation.
ID Developer Map Matching, 2020, retrieved from the internet at https://developer.here.com/documentation/android-premium/topics/map-matching.html, 4 pages.
"Wikipedia Map Matching", 2020, retrieved from the internet at https://en.wikipedia.org/wiki/Map_matching, 2 pages.
"SK Blue GPS", 2020, retrieved from the internet at https://www.sxbluegps.com/fr/technologie/le-gps-et-les-erreurs. 4 pages.
International Search Report and Written Opinion for International Application No. PCT/EP2019/072287, dated Oct. 24, 2019, 9 pages.
International Search Report and Written Opinion for International Application No. PCT/EP2019/072288, dated Oct. 24, 2019, 13 pages (French).

* cited by examiner

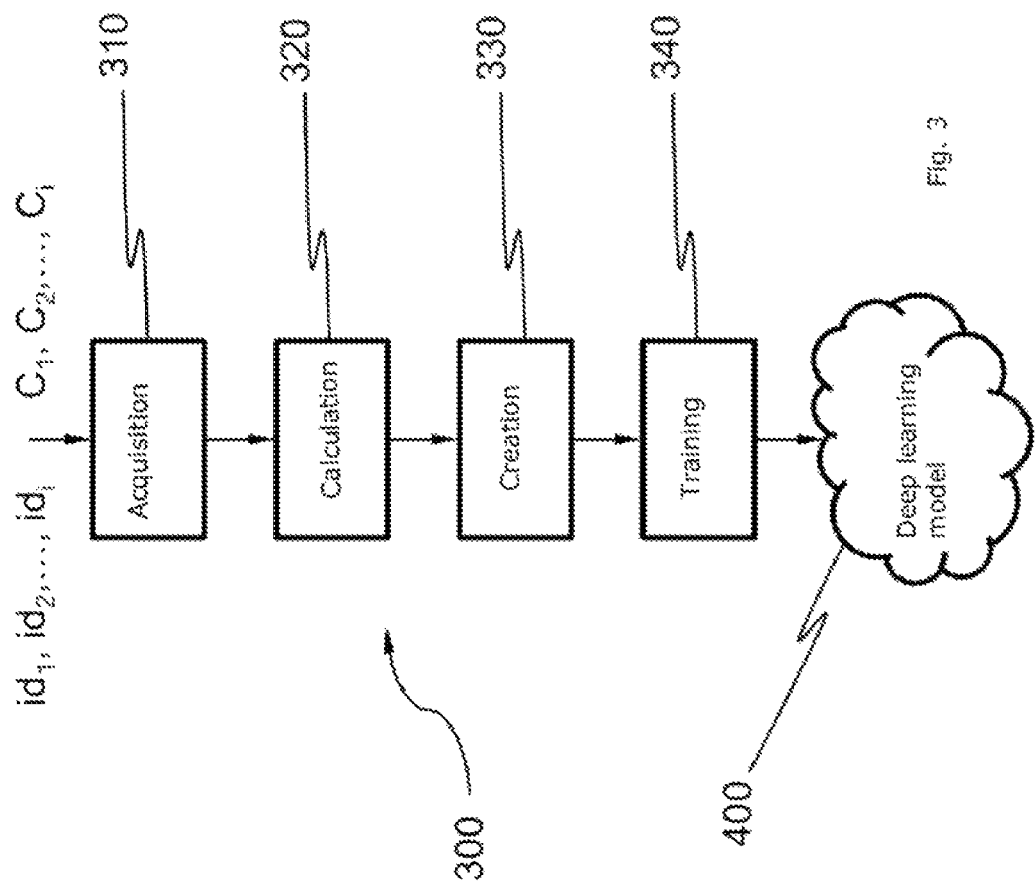

PREDICTION OF A CARTOGRAPHIC READJUSTMENT PARAMETER BY DEEP LEARNING

CROSS REFERENCE TO RELATED APPLICATIONS

This application is the U.S. National Phase Application of PCT International Application No. PCT/EP2019/072287, filed Aug. 20, 2019, which claims priority to French Patent Application No. 1858045, filed Sep. 7, 2018, the contents of such applications being incorporated by reference herein.

FIELD OF THE INVENTION

The present invention relates to the field of updating a digital road map. More specifically, the present invention relates to methods for training deep learning models, methods for predicting a map matching parameter, methods for updating a digital road map, and a computer program making it possible to implement the methods and devices for updating a digital road map.

BACKGROUND OF THE INVENTION

Terrestrial navigation is generally used to provide an indication of the position of a road vehicle. Since this vehicle generally moves over the road network, the position indication may refer to a digital map representative of said road network, which allows the road vehicle to have very concrete information, for example visual information for the driver, allowing them to take decisions to change direction at landmarks on the road network, for example.

In practice, the road vehicle may be located in a more consistent manner on the road network by matching its geographic position and said digital map using a map matching method.

However, the map matching service is not always available and correct, because it requires the presence of an accurate digital map, as well as knowledge of the initial absolute position of the road vehicle. Furthermore, even when the map matching service is available, it may be inoperative, in particular when the road vehicle is traveling on a section of the road network which is not covered by the digital map. This is also the case when the road vehicle is traveling on a fairly long section without a clear change in direction, such that matching to the digital road map does not provide a correction of the position with respect to the road segment traveled. Therefore, for a fairly long journey, a positioning error appears which may result in the next driving maneuver being presented to the driver at an incorrect time or, where a turn has to be made, in the correct route on the digital road map not being recognized.

Thus, to date, there are no effective methods for performing map matching when said service is unavailable or inoperative.

SUMMARY OF THE INVENTION

An aspect of the present invention therefore aims to eliminate, at least partially, the drawbacks mentioned above. To that end, a first aspect of the invention relates to a method for training a deep learning model trained to predict a map matching parameter on the basis of a measurement of geographic coordinates and of an identifier of the position sensor that has performed the measurement.

A second aspect of the invention relates to a method for predicting a map matching parameter on the basis of the machine learning model pretrained according to the first aspect of the invention.

A third aspect of the invention relates to a method for updating a digital road map on the basis of the map matching parameter obtained according to the second aspect of the invention.

A fourth aspect of the invention relates to a computer program with a program code for executing the method steps of the methods according to the first, second and third aspects of the invention, when the computer program is loaded into the computer or run on the computer.

Lastly, a fifth aspect of the invention relates to a device for updating a digital road map.

Thus, an aspect of the invention relates to a method for training a deep learning model. The training method comprises the following steps:

an acquisition step in which the following are acquired:
　a plurality of measurements of geographic coordinates that are representative of the position of each one from among a plurality of training road vehicles in circulation on at least one section of a road network, each section being associated with a segment of a digital road map that is representative of the road network and in which each segment consists of a plurality of successive points, and
　an identifier specific to each position sensor that has performed a measurement of geographic coordinates, a calculation step in which, for each measurement of geographic coordinates, a map matching parameter is calculated which defines a difference between the measurement of geographic coordinates and a position of a point of a segment of the digital road map where it is most likely to match the measurement of geographic coordinates, a creation step in which, for each measurement of geographic coordinates, a characteristic vector is created which comprises the measurement of geographic coordinates and the associated position sensor identifier, and a training step in which, for each measurement of geographic coordinates, the associated characteristic vector and the associated map matching parameter are presented, respectively, at the input and at the output of the deep learning model, and in which a supervised learning algorithm is applied to the deep learning model.

According to a first embodiment, the deep learning model is an artificial neural network.

According to a second embodiment:
　in the acquisition step, for each measurement of geographic coordinates, first additional data representative of the error in the measurement of the geographic coordinate are furthermore acquired, and
　in the creation step, for each measurement of geographic coordinates, the associated first additional data are added to the characteristic vector.

In one variant, in the training step, the first additional data are taken, alone or in combination, from among: the number of satellites used in the measurement of geographic coordinates, an indicator of the geometry conditions of the constellation of satellites used in the measurement of geographic coordinates, an indicator of the conditions of ionospheric propagation of the received satellite signals, an indicator of the quality of the received satellite signals and the time of the measurement of the geographic coordinate.

According to a third embodiment:
in the acquisition step, for each measurement of geographic coordinates, second additional data representative of proprioceptive data of the training road vehicle are furthermore acquired, and
in the creation step, for each measurement of geographic coordinates, the associated second additional data are added to the characteristic vector.

An aspect of the invention also covers a method for predicting a map matching parameter that defines a difference between a measurement of geographic coordinates representative of the position of a road vehicle and a position of a point of a segment of a digital road map where it is most likely to match the measurement of geographic coordinates, the method comprising a prediction step in which the map matching parameter is predicted on the basis of the measurement of geographic coordinates, of an identifier specific to the position sensor that has performed the measurement of geographic coordinates and of a deep learning model pretrained according to the training method described above.

An aspect of the invention also covers a device for updating a digital road map, the digital road map being representative of a road network and comprising at least one segment consisting of a plurality of successive points. The method comprises the following steps:
an acquisition step in which the following are acquired:
a plurality of measurements of geographic coordinates that are representative of the position of each one from among a plurality of road vehicles in circulation on at least one section of the road network, each section being associated with a segment of the digital road map, and
an identifier specific to the position sensor that has performed the measurement of geographic coordinates,
a prediction step in which, for each measurement of geographic coordinates, a map matching parameter is predicted according to the prediction method,
a calculation step in which, for each point of a segment of the digital road map with which a plurality of map matching parameters is associated, at least one measure of central tendency is calculated on the basis of the plurality of map matching parameters, and
an image processing step in which a digital layer is added to the digital road map, the digital layer comprising the measure of central tendency at the associated point of the segment of the digital road map.

In one particular implementation:
in the calculation step, for each point of a segment of the digital road map with which a plurality of map matching parameters is associated, at least one measure of dispersion is calculated on the basis of the plurality of map matching parameters, and
in the image processing step, a digital layer is added to the digital road map, the digital layer comprising the measure of dispersion at the associated point of the segment of the digital road map.

In another implementation, in the image processing step, the digital layer is added to the digital road map only when the measure of central tendency and/or measure of dispersion is beyond a predetermined value for a predetermined period.

Additionally, an aspect of the invention covers a computer program with a program code for executing the method steps of the digital road map training, prediction and updating methods, when the computer program is loaded into a computer or run on the computer.

An aspect of the invention also covers a non-transient storage medium on which the computer program, above, is stored.

Lastly, an aspect of the invention covers a device for updating a digital road map, the digital road map being representative of a road network and comprising at least one segment consisting of a plurality of successive points. The device comprises a processor comprising:
an acquisition module for acquiring:
a plurality of measurements of geographic coordinates that are representative of the position of each one from among a plurality of road vehicles in circulation on at least one section of the road network, each section being associated with a segment of the digital road map, and
an identifier specific to each position sensor that has performed a measurement of geographic coordinates,
a prediction module for predicting, for each measurement of geographic coordinates, a map matching parameter,
a calculation module for calculating, for each point of a segment of the digital road map with which a plurality of map matching parameters is associated, at least one measure of central tendency or measure of dispersion on the basis of the plurality of map matching parameters, and
an image processing module for adding a digital layer to the digital road map, the digital layer comprising the measure of central tendency or measure of dispersion at the associated point of the segment of the digital road map.

In one particular implementation, the image processing module is further configured to add the digital layer to the digital road map only when the measure of central tendency and/or measure of dispersion is beyond a predetermined value for a predetermined period.

BRIEF DESCRIPTION OF THE DRAWINGS

Other features and advantages of aspects of the invention will be better understood on reading the following description with reference to the appended drawings, which are non-limiting and given by way of illustration.

FIG. 3 shows a method for training a deep learning model according to an aspect of the invention.

DETAILED DESCRIPTION OF THE PREFERRED EMBODIMENTS

For the sake of clarity, the elements shown have not necessarily been drawn to the same scale with respect to each other, unless otherwise indicated.

The general principle of an aspect of the invention is based on the use of machine learning to predict a map matching parameter. Accordingly, in an aspect of the invention, a statistical deep learning model is trained according to a "supervised" machine learning scheme in which past observations are labeled. In practice, observations are said to be "labeled" when each of them is accompanied by a label which identifies the effect to be predicted. Thereafter, the pretrained statistical deep learning model is used to predict the map matching parameter on the basis of a measurement of geographic coordinates and of an identifier of the position sensor that has performed the measurement of geographic coordinates. Finally, the map matching parameter can be used to update a digital road map.

Figure 1:
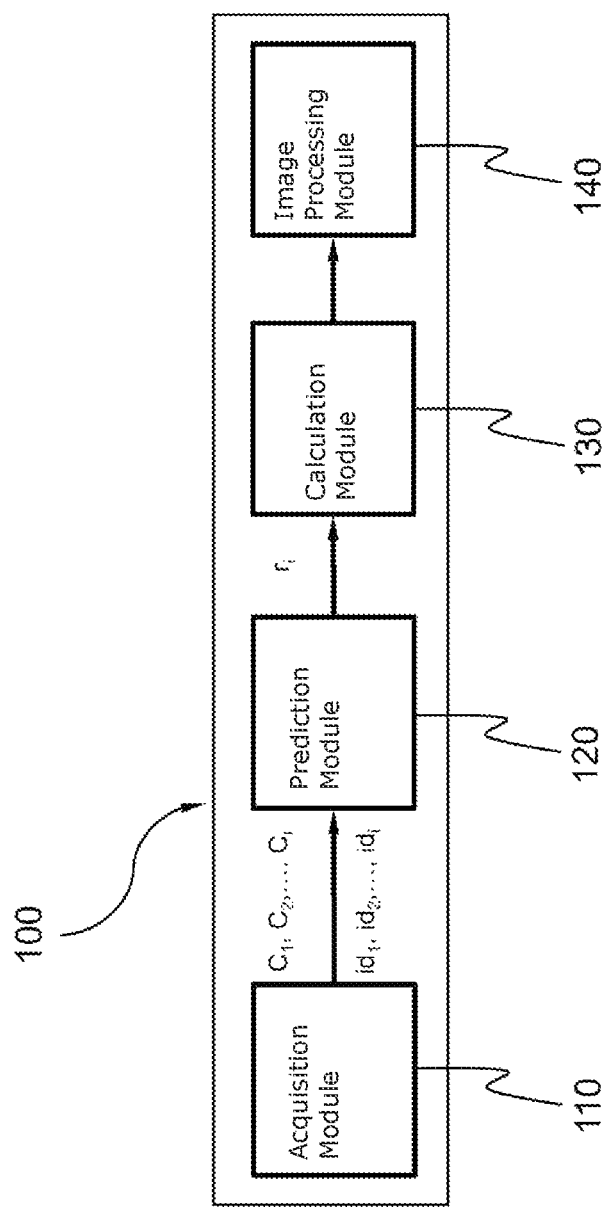
FIG. 1 shows a device for updating a digital road map according to an aspect of the invention.

FIG. 1 illustrates a device 100 for updating a digital road map according to an aspect of the invention.

Figure 2:
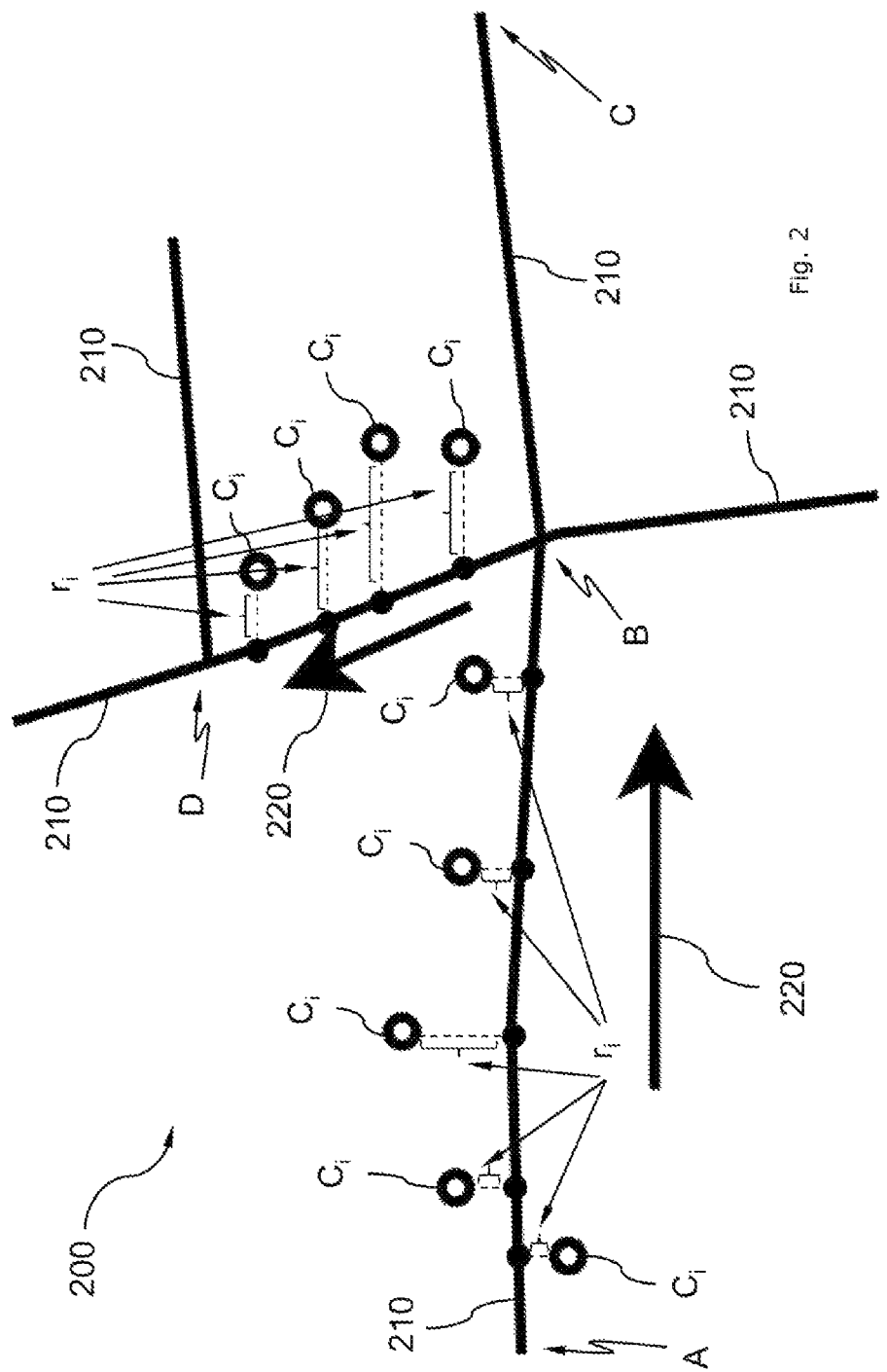
FIG. 2 shows a digital road map that is usable according to an aspect of the invention.

FIG. 2 illustrates a digital road map 200 representative of a road network comprising several sections. In the example of FIG. 2, the digital road map 200 comprises a segment 210 associated with each section of the road network. Thus, in FIG. 2, a first segment 210 connects road nodes A and B, a second segment 210 connects road nodes B and C and a third segment 210 connects road nodes B and D. In one particular implementation, as illustrated in FIG. 2, a segment 210 may be associated with a direction of circulation 220. Lastly, conventionally, each segment 210 is made up of a plurality of successive points (not shown) and may comprise, for each point, an indication of curvature, direction or slope of the corresponding road at this point.

Returning to FIG. 1, the device 100 comprises an acquisition module 110, a prediction module 120, a calculation module 130 and an image processing module 140 which are functionally coupled to one another. In one particular implementation, the acquisition module 110, the prediction module 120, the calculation module 130 and the image processing module 140 are included in a single processing module of processor type.

In FIG. 1, the acquisition module 110 is configured to acquire a plurality of measurements of geographic coordinates $C_1, C_2, \ldots, C_i$. In an aspect of the invention, the measurements of geographic coordinates $C_1, C_2, \ldots, C_i$ are representative of the position of each one from among a plurality of road vehicles (not shown) in circulation on at least one section of a road network. What is meant by road vehicle is any vehicle equipped with an engine or motor (generally an internal combustion engine or electric motor) intended to move it on a road network and capable of transporting people or loads (for example, a car, a truck or a motorcycle). In one implementation of an aspect of the invention, the acquisition module 110 comprises a position sensor on board each road vehicle. In one example, the position sensor forms part of a GNSS (global navigation satellite system), such as the American system GPS, the Russian system GLONASS and/or the European system GALILEO.

In addition, the acquisition module 110 is configured to acquire an identifier $id_1, id_2, \ldots, id$ specific to each position sensor that has performed a measurement of geographic coordinates $C_1, C_2, \ldots, C_i$. In one example, the identifier $id_1, id_2, \ldots, id$ is an alphanumeric value representative of the model of the position sensor and therefore of the performance of the position sensor in the measurement of geographic coordinates $C_1, C_2, \ldots, C_i$.

Furthermore, in FIG. 1, the prediction module 120 is configured to predict, for each measurement of geographic coordinates $C_1, C_2, \ldots, C_i$, a map matching parameter $r_i$.

What is meant by map matching parameter $r_i$ is a parameter that defines a difference between a measurement of geographic coordinates $C_1, C_2, \ldots, C_i$ and a position of a point of a segment 210 of the digital road map 200 where it is most likely to match the measurement of geographic coordinates $C_1, C_2, \ldots, C_i$. As indicated above, this map matching technique is used to periodically correct the inaccuracies which may result from the position sensors. In practice, this technique consists in regularly comparing the geographic positions of a road vehicle with a digital map, in order to determine the route taken. To that end, a distance error $r_i$ between each measurement of geographic coordinates $C_1, C_2, \ldots, C_i$ and its most likely match in segment 210 of the digital road map 200 is calculated.

FIG. 2 illustrates, on the digital road map 200, a plurality of geographic coordinates $C_1, C_2, \ldots, C_i$ associated with a road vehicle (not shown). In addition, FIG. 2 illustrates the map matching parameter $r_i$ for each one of the plurality of geographic coordinates $C_i, C_2, \ldots, C_i$.

Returning to FIG. 1, the prediction module 120 uses a pretrained deep learning model to predict the map matching parameter $r_i$ on the basis of a measurement of geographic coordinates $C_i, C_2, \ldots, C_i$ and of the identifier $id_1, id_2, \ldots, id_i$ of the associated position sensor.

FIG. 3 illustrates a method 300 for training a deep learning model 400 according to an aspect of the invention. The training method 300 comprises an acquisition step 310, a calculation step 320, a creation step 330 and a training step 340.

The training method 300 requires a plurality (not shown) of training road vehicles which are used for training the deep learning model 400. During the training of the deep learning model 400, the training road vehicles circulate on at least one section of the road network. In addition, each section is associated with a segment 210 of a digital road map 200 representative of the road network. Each training road vehicle is equipped with at least one position sensor (not shown) of known type such as the one above with reference to FIG. 1. Thus, an aspect of the invention is based on the fact that the majority of current road vehicles comprise a position sensor which is generally used by driver assistance systems.

In the example of FIG. 3, the training method 300 consists first of all in acquiring, in the acquisition step 310, a plurality of measurements of geographic coordinates $C_i, C_2, \ldots, C_i$ using the position sensor associated with the road training vehicles. In addition, in the acquisition step 310, the identifier $id_1, id_2, \ldots, id_i$ specific to each position sensor that has performed a measurement of geographic coordinates $C_1, C_2, \ldots, C_i$ is acquired. In one particular implementation, each training road vehicle comprises a data communication bus, for example of CAN ("Controller Area Network") or FlexRay type, which is coupled to the associated position sensor. In this case, it is possible to acquire the identifier $id_1, id_2, \ldots, id_i$ via the communication bus.

Next, in the calculation step 320, for each measurement of geographic coordinates $C_i, C_2, \ldots, C_i$, the map matching parameter $r_i$ associated with the measurement of geographic coordinates $C_1, C_2, \ldots, C_i$ and a position of a point of a segment 210 of the digital road map 200 where it is most likely to match the measurement of geographic coordinates $C_i, C_2, \ldots, C_i$ is calculated. As indicated above, the map matching parameter $r_i$ defines a difference between a measurement of geographic coordinates $C_1, C_2, \ldots, C_i$ and a segment 210 or the position of a point of a segment 210 of the digital map road 200 where it is most likely to match the measurement of geographic coordinates $C_1, C_2, \ldots, C_i$ in question.

Additionally, in the creation step 330, for each measurement of geographic coordinates $C_1, C_2, \ldots, C_i$, a characteristic vector is created which comprises the measurement of geographic coordinates $C_1, C_2, \ldots, C_i$ and the associated position sensor identifier $id_1, id_2, \ldots, id_i$.

Lastly, in the training step 340, for each measurement of geographic coordinates $C_1, C_2, \ldots, C_i$, the associated characteristic vector and the associated map matching parameter $r_i$ are presented, respectively, at the input and at the output of the deep learning model 400. Additionally, a supervised learning algorithm is applied to the deep learning model 400.

In the training step 340, the deep learning model 400 is trained by delivering, to the deep learning model 400, a training set of data taking the form of pairs (X, Y), in which X corresponds to a set of predictor variables ("input features") and Y corresponds to a variable to be classed ("output" or "target"). In an aspect of the invention, a pair (X, Y) is defined such that the predictor variable X corresponds to all or some of the measurements of geographic coordinates $C_1, C_2, \ldots, C_i$ and the variable to be predicted Y corresponds to the map matching parameters $r_i$ associated with the predictor variable X.

In one implementation of an aspect of the invention, the deep learning model 400 is an artificial neural network. In one example, the artificial neural network comprises an output neuron which corresponds to the map matching parameter $r_i$ to be predicted. The number of input neurons is equal to the number of samples of measurements of geographic coordinates $C_1, C_2, \ldots, C_i$ and of position sensor identifiers $id_1, id_2, \ldots, id_i$ to be taken into consideration for predicting the map matching parameter $r_i$. The artificial neural network comprises a number of input neurons and a number of intermediate layers, also called hidden layers, which are defined empirically. The artificial neural network implements an activation function, for example of sigmoid type, allowing, for each of the output neurons, the provision of a likelihood that the associated map matching parameter $r_i$ is that which corresponds to the data of the measurements of geographic coordinates $C_1, C_2, \ldots, C_i$ and of the position sensor identifiers $id_1, id_2, \ldots, id_i$, supplied to the input neurons. When one of these likelihoods is greater than a predefined threshold, the corresponding map matching parameter $r_i$ is considered to have been predicted correctly. In this implementation, the synaptic weights are determined by the supervised learning algorithm. There are a great many supervised learning algorithms, such as the backpropagation method. The principle of this algorithm consists, on the basis of a stimulus at the input of a neural network, in calculating the output of the neural network, comparing it with the expected output and backpropagating an error signal in the neural network, which modifies the synaptic weights via a gradient descent method.

At the end of the training step 340, the deep learning model 400 is then trained to predict a map matching parameter $r_i$ on the basis of a measurement of geographic coordinates $C_i, C_2, \ldots, C_i$ and of the identifier $id_1, id_2, \ldots, id_i$ of the associated position sensor.

In one implementation of the training method 300, in the acquisition step 310, for each measurement of geographic coordinates $C_i, C_2, \ldots, C_i$, first additional data representative of the error in the measurement of the geographic coordinate are furthermore acquired. In one example, the first additional data are taken, alone or in combination, from among: the number of satellites used in the measurement of geographic coordinates, an indicator of the geometry conditions of the constellation of satellites used in the measurement of geographic coordinates (for example the DOP, for dilution of precision), an indicator of the conditions of ionospheric propagation of the received satellite signals, an indicator of the quality of the received satellite signals (for example the carrier to noise ratio C/N, the energy per bit to noise power spectral density ratio $E_b/N_0$, carrier to interference ratio C/I) and the time of the measurement of the geographic coordinate. Next, in the creation step 330, for each measurement of geographic coordinates, the associated first additional data are added to the characteristic vector.

In another implementation of the training method 300, in the acquisition step 310, for each measurement of geographic coordinates, second additional data representative of proprioceptive data of the training road vehicle are furthermore acquired. What is meant by proprioceptive data is then data acquired using proprioceptive sensors of a training road vehicle such as the atmospheric pressure sensor, the gyroscope, the acceleration/deceleration sensor or the attitude sensor. Next, in the creation step 330, for each measurement of geographic coordinates, the associated second additional data are added to the characteristic vector.

In one particular embodiment of the invention, the various steps of the training method 300 are defined by computer program instructions. Therefore, an aspect of the invention is also pertains to a program containing a computer program code stored on a non-transient storage medium, this program code being capable of executing the steps of the training method 300 when the computer program is loaded into the computer or run on the computer. In addition, all or part of the program may be implemented in a remote server to which the road vehicle is connected.

Returning to FIG. 1, the calculation module 130 is configured to calculate, for each point of a segment 210 of the digital road map 200 with which a plurality of map matching parameters $r_i$ is associated, at least one measure of central tendency and/or measure of dispersion on the basis of the plurality of map matching parameters. In one example of an aspect of the invention, the measure of central tendency is a mean or a median. In another example of an aspect of the invention, the measure of dispersion is a minimum, a maximum, a standard deviation or a variance.

In one particular implementation, the measure of dispersion may be used by a navigation system or a driver assistance system of a vehicle to monitor deterioration in the performance of the associated position sensor. The deterioration may be evaluated by comparing the measure of dispersion beyond a predetermined dispersion value over a predetermined period or for a predetermined number of measurements. For example, a measure of dispersion greater than the predetermined dispersion value over a period of one week could trigger a malfunction signal for the position sensor in a navigation system. In another example, a measure of dispersion greater than the predetermined dispersion value for one hundred consecutive measurements could trigger a malfunction signal for the position sensor in a driver assistance system.

Lastly, in FIG. 1, the image processing module 140 is configured to add a digital layer to the digital road map 200, the digital layer comprising the measure of central tendency and/or measure of dispersion at the associated point of the segment 210 of the digital road map 200. In one particular implementation, the image processing module 140 is configured to add the digital layer to the digital road map 200 only when the measure of central tendency and/or measure of dispersion is beyond a predetermined value for a predetermined period. For example, the digital road map 200 could be updated only when the measure of central tendency and/or measure of dispersion has varied by more than 5% over a period of one month of measurements. However, other predetermined values and other predetermined periods may be considered.

It should be noted that an aspect of the invention also covers a method for updating a digital road map 200 such as implemented by the device 100.

It should also be noted that it is envisaged that a plurality of deep learning models 400 be trained in order to predict the map matching parameter $r_i$ according to the model of the position sensor used to perform the measurements of geographic coordinates $C_i, C_2, \ldots, C_i$. Thus, for example, it will be possible to obtain a first deep learning model 400 for a first position sensor model, a second deep learning model 400 for a second position sensor model, and so on.

An aspect of the present invention has been described and illustrated via the present detailed description and via the figures. However, an aspect of the present invention is not limited to the presented embodiments. Thus, after reading the present description and studying the appended drawings, those skilled in the art will be able to deduce and implement other embodiments and variants.

The invention claimed is:

1. A method for training a deep learning model, the method comprising:
   an acquisition step in which the following are acquired:
      a plurality of measurements of geographic coordinates that are representative of the position of each one from among a plurality of training road vehicles in circulation on at least one section of a road network, each section being associated with a segment of a digital road map that is representative of the road network and in which each segment consists of a plurality of successive points, and
      an identifier specific to at least one position sensor that has performed at least one measurement of the plurality of measurements of geographic coordinates,
   a calculation step in which, for each of the at least one measurement of the plurality of measurements of geographic coordinates, a map matching parameter is calculated which defines a difference between the at least one measurement of the plurality of measurements of geographic coordinates and a position of a point of a segment of the digital road map where it is most likely to match the at least one measurement of the plurality of measurements of geographic coordinates,
   a creation step in which, for each of the at least one measurement of the plurality of measurements of geographic coordinates, a characteristic vector is created which comprises the at least one measurement of the plurality of measurements of geographic coordinates and the associated position sensor identifier, and
   a training step in which, for each of the at least one measurement of the plurality of measurements of geographic coordinates, the associated characteristic vector and the associated map matching parameter are presented, respectively, at the input and at the output of the deep learning model, and in which a supervised learning algorithm is applied to the deep learning model.

2. The training method as claimed in claim 1, wherein the deep learning model is an artificial neural network.

3. The training method as claimed in claim 1, wherein:
   in the acquisition step, for each of the at least one measurement of the plurality of measurements of geographic coordinates, first additional data representative of the error in the measurement of the geographic coordinate are furthermore acquired, and
   in the creation step, for each of the at least one measurement of the plurality of measurements of geographic coordinates, the associated first additional data are added to the characteristic vector.

4. The training method as claimed in claim 3, wherein the first additional data are taken, alone or in combination, from among: the number of satellites used in the at least one measurement of the plurality of measurements of geographic coordinates, an indicator of the geometry conditions of the constellation of satellites used in the at least one measurement of the plurality of measurements of geographic coordinates, an indicator of the conditions of ionospheric propagation of the received satellite signals, an indicator of the quality of the received satellite signals and the time of the measurement of the geographic coordinate.

5. The training method as claimed in claim 1, wherein: in the acquisition step, for each of the at least one measurement of the plurality of measurements of geographic coordinates, second additional data representative of proprioceptive data of the training road vehicle are furthermore acquired, and
   in the creation step, for each of the at least one measurement of the plurality of measurements of geographic coordinates, the associated second additional data are added to the characteristic vector.

6. A method for predicting a map matching parameter that defines a difference between at least one measurement of the plurality of measurements of geographic coordinates representative of the position of a road vehicle and a position of a point of a segment of a digital road map where it is most likely to match the at least one measurement of the plurality of measurements of geographic coordinates, the method comprising a prediction step in which the map matching parameter is predicted on the basis of the at least one measurement of the plurality of measurements of geographic coordinates, of an identifier specific to the position sensor that has performed the at least one measurement of the plurality of measurements of geographic coordinates and of a deep learning model pretrained as claimed in claim 1.

7. A method for updating a digital road map, the digital road map being representative of a road network and comprising at least one segment consisting of a plurality of successive points, the method comprising:
   an acquisition step in which the following are acquired:
      a plurality of measurements of geographic coordinates that are representative of the position of each one from among a plurality of road vehicles in circulation on at least one section of the road network, each section being associated with a segment of the digital road map, and
      an identifier specific to at least one position sensor that has performed at least one measurement of the plurality of measurements of geographic coordinates,
   a prediction step in which, for each of the at least one measurement of the plurality of measurements of geographic coordinates, a map matching parameter that defines a difference between the at least one measurement of the plurality of measurements of geographic coordinates representative of the position of a road vehicle and a position of a point of a segment of a digital road map where it is most likely to match the at least one measurement of the plurality of measurements of geographic coordinates is predicted on the basis of the at least one measurement of the plurality of measurements of geographic coordinates, of the identifier specific to the at least one position sensor that has performed the at least one measurement of the plurality of measurements of geographic coordinates and of a pretrained deep learning model,
   a calculation step in which, for each point of a segment of the digital road map with which a plurality of map matching parameters is associated, at least one measure of central tendency is calculated on the basis of the plurality of map matching parameters associated with said each point of the segment of the digital road map, and an image processing step in which a digital layer is added to the digital road map, the digital layer comprising the measure of central tendency at the associated point of the segment of the digital road map.

8. The method for updating a digital road map as claimed in claim 7, wherein:

in the calculation step, for each point of a segment of the digital road map with which a plurality of map matching parameters is associated, at least one measure of dispersion is calculated on the basis of the plurality of map matching parameters associated with said each point of the segment of the digital road map, and in the image processing step, a digital layer is added to the digital road map, the digital layer comprising the measure of dispersion at the associated point of the segment of the digital road map.

9. The method as claimed in claim 7, wherein, in the image processing step, the digital layer is added to the digital road map only when the measure of central tendency is beyond a predetermined value for a predetermined period.

10. A device for updating a digital road map, the digital road map being representative of a road network and comprising at least one segment consisting of a plurality of successive points, the device comprising a processor configured to:

acquire:
a plurality of measurements of geographic coordinates that are representative of the position of each one from among a plurality of road vehicles in circulation on at least one section of the road network, each section being associated with a segment of the digital road map, and an identifier specific to at least one position sensor that has performed at least one measurement of the plurality of measurements of geographic coordinates, predict, for each of the at least one measurement of the plurality of measurements of geographic coordinates, a map matching parameter that defines a difference between at least one measurement of the plurality of measurements of geographic coordinates representative of the position of a road vehicle and a position of a point of a segment of a digital road map where it is most likely to match the at least one measurement of the plurality of measurements of geographic coordinates, on the basis of the at least one measurement of the plurality of measurements of geographic coordinates, of the identifier specific to the at least one position sensor that has performed the at least one measurement of the plurality of measurements of geographic coordinates and of a pretrained deep learning model, calculate, for each point of a segment of the digital road map with which a plurality of map matching parameters is associated, at least one measure of central tendency and/or measure of dispersion on the basis of the plurality of map matching parameters associated with said each point of the segment of the digital road map, and add a digital layer to the digital road map, the digital layer comprising the measure of central tendency and/or measure of dispersion at the associated point of the segment of the digital road map.

11. The device as claimed in claim 10, wherein the processor is further configured to add the digital layer to the digital road map only when the measure of central tendency and/or the measure of dispersion is beyond a predetermined value for a predetermined period.

12. The training method as claimed in claim 2, wherein:

in the acquisition step, for each of the at least one measurement of the plurality of measurements of geographic coordinates, first additional data representative of the error in the measurement of the geographic coordinate are furthermore acquired, and in the creation step, for each of the at least one measurement of the plurality of measurements of geographic coordinates, the associated first additional data are added to the characteristic vector.

13. The method as claimed in claim 8, wherein, in the image processing step, the digital layer is added to the digital road map only when the measure of central tendency and/or the measure of dispersion is beyond a predetermined value for a predetermined period.

14. The method as claimed in claim 7, wherein the at least one measure of central tendency for each point of the segment of the digital road map is a mean value or a median value of the plurality of map matching parameters associated with said each point of the segment of the digital road map.

15. The method as claimed in claim 8, wherein the at least one measure of dispersion for each point of the segment of the digital road map is a minimum, a maximum, a standard deviation, or a variance of the plurality of map matching parameters associated with said each point of the segment of the digital road map.

16. The device as claimed in claim 10, wherein the at least one measure of central tendency for each point of the segment of the digital road map is a mean value or a median value of the plurality of map matching parameters associated with said each point of the segment of the digital road map.

17. The device as claimed in claim 10, wherein the at least one measure of dispersion for each point of the segment of the digital road map is a minimum, a maximum, a standard deviation, or a variance of the plurality of map matching parameters associated with said each point of the segment of the digital road map.

* * * * *